United States Patent
Nagao et al.

(10) Patent No.: US 11,964,253 B2
(45) Date of Patent: Apr. 23, 2024

(54) PRODUCTION METHOD FOR CORE-SHELL POROUS SILICA PARTICLES

(71) Applicants: TOHOKU UNIVERSITY, Sendai (JP); DAICEL CORPORATION, Osaka (JP)

(72) Inventors: Daisuke Nagao, Sendai (JP); Haruyuki Ishii, Sendai (JP); Shunho Ishikawa, Sendai (JP)

(73) Assignees: TOHOKU UNIVERSITY, Sendai (JP); DAICEL CORPORATION, Osaka (JP)

( * ) Notice: Subject to any disclaimer, the term of this patent is extended or adjusted under 35 U.S.C. 154(b) by 715 days.

(21) Appl. No.: 17/252,042

(22) PCT Filed: Jun. 17, 2019

(86) PCT No.: PCT/JP2019/023805
§ 371 (c)(1),
(2) Date: Dec. 14, 2020

(87) PCT Pub. No.: WO2019/240294
PCT Pub. Date: Dec. 19, 2019

(65) Prior Publication Data
US 2021/0260563 A1    Aug. 26, 2021

(30) Foreign Application Priority Data

Jun. 15, 2018  (JP) .................. 2018-114153

(51) Int. Cl.
*B01J 20/10* (2006.01)
*B01J 20/28* (2006.01)
(Continued)

(52) U.S. Cl.
CPC ....... *B01J 20/103* (2013.01); *B01J 20/28021* (2013.01); *B01J 20/283* (2013.01);
(Continued)

(58) Field of Classification Search
CPC .. B01J 20/103; B01J 20/28021; B01J 20/283; B01J 20/3204; B01J 20/3214;
(Continued)

(56) References Cited

U.S. PATENT DOCUMENTS

2005/0121654 A1   6/2005   Muraguchi et al.
2009/0053524 A1   2/2009   Yamada et al.
(Continued)

FOREIGN PATENT DOCUMENTS

CN    85 1 05348 A    12/1986
EP    1 886 972 A1    2/2008
(Continued)

OTHER PUBLICATIONS

Atkin, R. et al., 2003, "The influence of chain length and electrolyte on the adsorption kinetics of cationic surfactants at the silica-aqueous solution interface," Journal of Colloid and Interface Science, 266, 236-244. <doi:10.1016/S0021-9797(03)00631-3> (Year: 2003).*

(Continued)

*Primary Examiner* — Brian A McCaig
(74) *Attorney, Agent, or Firm* — Birch, Stewart, Kolasch & Birch, LLP (57) ABSTRACT

Provided is a production method for core-shell porous silica particles, the production method including: a preparation step of preparing an aqueous solution comprising non-porous silica particles, a cationic surfactant, a basic catalyst, an electrolyte, and an alcohol; a shell precursor formation step at adding a silica source to the aqueous solution to form a shell precursor on a surface of the non-porous silica particles; and a shell formation step of removing the cationic surfactant from the shell precursor to form a porous shell.

14 Claims, 4 Drawing Sheets

(51) Int. Cl.
*B01J 20/283* (2006.01)
*B01J 20/32* (2006.01)

(52) U.S. Cl.
CPC ....... *B01J 20/3204* (2013.01); *B01J 20/3214* (2013.01); *B01J 20/3234* (2013.01); *B01J 20/3293* (2013.01)

(58) Field of Classification Search
CPC ............... B01J 20/3234; B01J 20/3293; C01P 2004/04; C01P 2004/61; C01P 2004/62; C01P 2004/64; C01P 2004/86; C01P 2004/88; C01P 2006/12; C01P 2006/14; C01P 2006/16; C01B 33/18; C09C 1/3054; Y02E 60/10
See application file for complete search history.

(56) References Cited

U.S. PATENT DOCUMENTS

| | | |
|---|---|---|
| 2013/0267629 A1 | 10/2013 | Fukuoka et al. |
| 2017/0282155 A1 | 10/2017 | Wei et al. |
| 2020/0071171 A1 | 3/2020 | Konno et al. |

FOREIGN PATENT DOCUMENTS

| | | |
|---|---|---|
| GB | 2497105 A | 6/2013 |
| JP | 2012-171833 A | 9/2012 |
| WO | WO 2007/122930 A1 | 11/2007 |
| WO | WO 2010/061367 A2 | 6/2010 |
| WO | WO 2016/152872 A1 | 9/2016 |
| WO | WO 2017/141821 A1 | 8/2017 |
| WO | WO 2017/155870 A1 | 9/2017 |

OTHER PUBLICATIONS

Iler, R.K., 1979, The Chemistry of Silica: Solubility, Polymerization, Colloid and Surface Properties and Biochemistry of Silica, Wiley, 866 pp (Office action cites 659). (Year: 1979).*

Extended European Search Report dated May 21, 2021, in European Patent Application No. 19819870.7.

English translation of Chinese Office Action and Search Report for Chinese Application No. 201980039341.0, dated Dec. 7, 2022.

Beck et al.. "A New Family of Mesoporous Molecular Sieves Prepared with Liquid Crystal Templates," J. Am. Chem. Soc., vol. 114, 1992, pp. 10834-10843.

English translation of the International Search Report, dated Sep. 3, 2019, for International Application No. PCT/JP2019/023805.

International Preliminary Report on Patentability and English translation of the Written Opinion of the International Searching Authority, dated Dec. 24, 2020, for International Application No. PCT/JP2019/023805.

Zhang et al., "Synthesis and Characterization of Pore Size-Tunable Magnetic Mesoporous Silica Nanoparticles," Journal of Colloid and Interface Science, vol. 361, 2011 (Available online May 23, 2011), pp. 16-24.

* cited by examiner

PRODUCTION METHOD FOR CORE-SHELL POROUS SILICA PARTICLES

TECHNICAL FIELD

The present disclosure relates to a production method for core-shell porous silica particles.

BACKGROUND ART

Porous materials such as porous silica are widely used as adsorbents and catalysts due to their large specific surface areas, and it is expected that their use is expanded by forming such porous materials into particles. For example, mesoporous silica particles (MSP) having a pore diameter of approximately from 2 to 50 nm can be used for drug delivery when the particle size is 100 nm, and can be used as fillers for liquid chromatography columns when the particles are of a micron size. In such cases, it is necessary for the particle size to be as uniform as possible, that is, for the particles to be a monodispersed system. Furthermore, in cases where porous silica is used as a filling material for liquid chromatography, it is necessary for the porous silica to have low liquid feeding resistance and high separation efficiency.

In order to reduce the liquid feeding resistance, the particle size of the porous silica may be increased. However, when the particle size of the porous silica is increased, it takes time for a substance to be separated, which are adsorbed by the porous silica and reach the center part of the porous silica, to be released from the porous silica, and thus separation efficiency decreases. On the other hand, if the particle size of the porous silica is reduced to increase the separation efficiency, the liquid feeding resistance increases.

In order to achieve both low liquid feeding resistance (suppression of pressure loss) and high separation efficiency, the use of core shell type silica in which the surfaces of non -porous silica core particles are covered with a shell made from porous silica has been considered. Since the core-shell type silica has a non-porous silica core particle at the center, the substance to be separated, which is adsorbed by the core-shell type silica, remains in the shell near the surface. Thus, the time from the adsorption by the core-shell type silica until the release of the substance to be separated is short, and the separation efficiency is high. In addition, by increasing the size of the silica core particles, the particle size of the core -shell type silica can be increased while reducing the thickness of the shell, and thus liquid feeding resistance can be reduced without causing the separation efficiency to be decreased.

Various core-shell type silicas have been developed so far (for example, see Patent Document 1 and Non-Patent Literatures 1 and 2). A core-shell type silica having high sphericity and a narrow particle size distribution and a method for producing the same have also been developed (Patent Document 2).

Furthermore, a method for producing core-shell porous silica particles having increased monodispersion and an increased peak pore diameter has also been developed (Patent Document 3). However, with regard to the shell of the particles formed by these methods, there is room for improvements such as further increasing the thickness.

CITATION LIST

Patent Document
Patent Document 1: JP 2012-171833 A
Patent Document 2: WO 2007/122930
Patent Document 3: WO 2017/141821

Non-Patent Document
Non-Patent Document 1: J. S. Beck et al., J. Am. Chem. Soc., 114, 10834 (1992)
Non-Patent Literature 2: Journal of Colloid and Interface Science, 361 (2011) 16-24

SUMMARY OF INVENTION

Technical Problem

An object of the present disclosure is to provide a method for producing core -shell porous silica particles with an increased thickness of the shell.

Solution to Problem

As a result of diligent research carried out to solve the above problem, the inventors of the present disclosure discovered that when producing core-shell porous silica particles, an electrolyte contributes to the increased thickness of the shell, and thereby the inventors completed the present disclosure. The present disclosure is as follows.

[1] A production method for core-shell porous silica particles, the production method including:
a preparation step of preparing an aqueous solution containing non-porous silica particles, a cationic surfactant, a basic catalyst, an electrolyte, and an alcohol;
a shell precursor formation step of adding a silica source to the aqueous solution to form a shell precursor on a surface of the non-porous silica particles; and
a shell formation step of removing the cationic surfactant from the shell precursor to form a porous shell.

[2] The production method according to [1], wherein concentration of the electrolyte in the aqueous solution is from 1 mM to 4 mM.

[3] The production method according to [1] or [2], wherein the electrolyte is a chlorine based electrolyte, a bromine-based electrolyte, or an iodine-based electrolyte.

[4] The production method according to [3], wherein the chlorine -based electrolyte is sodium chloride, potassium chloride or lithium chloride.

[5] The production method according to [3], wherein the bromine -based electrolyte is sodium bromide, potassium bromide, or lithium bromide.

[6] The production method according to [3], wherein the iodine -based electrolyte is sodium iodide potassium iodide, or lithium iodide.

[7] The production method according to any of [1] to [6], wherein the cationic surfactant is a hexadecyltrimethylammonium halide or an octadecyltrimethylammonium halide.

[8] The production method according to any one of [1] to [7], wherein the basic catalyst is ammonia.

[9] The production method according to any one of [1] to [8], wherein the alcohol is ethanol.

[10] The production method according to any one of [1] to [9], wherein the silica source is tetraethoxysilane.

Advantageous Effects of Invention

According to the present disclosure, a method for producing core-shell porous silica particles with an increased thickness of the shell can be provided.

DESCRIPTION OF EMBODIMENTS

The present disclosure is a production method for core-shell porous silica particles, the production method including: a preparation step of preparing an aqueous solution containing non-porous silica particles, a cationic surfactant, a basic catalyst, an electrolyte, and an alcohol; a shell precursor formation step in which a silica source is added to the aqueous solution to form a shell precursor on a surface of the non-porous silica particles; and a shell formation step in which the cationic surfactant is removed from the shell precursor to form a porous shell. The production method according to an embodiment of the present disclosure includes the above-mentioned steps, but may include other steps.

<1. Preparation Step>

The present disclosure includes a preparation step of preparing an aqueous solution containing non-porous silica particles, a cationic surfactant, a basic catalyst, an electrolyte, and an alcohol. Other steps may be included. Here, the aqueous solution herein may be a liquid in which a substance is dissolved in water, or a liquid in which a substance is dispersed in water. That is, the water of the aqueous solution may be a solvent or a dispersing medium.

In this step, a first aqueous solution containing non-porous silica particles and a cationic surfactant may be prepared, and then a second aqueous solution containing the first aqueous solution and an electrolyte may be prepared, after which a third aqueous solution containing the second aqueous solution, an alcohol, and a basic catalyst may be prepared.

(Non-porous Silica Particles)

The non-porous silica particles in this step are used as core particles of the core-shell porous silica particles produced by the production method according to an embodiment of the present disclosure, and are substantially non-porous.

Substantially non-porous means that the core particles have a specific surface area of 50 m$^2$/g or less as measured using a nitrogen gas adsorption method. By setting the specific surface area of the core particles to 50 m$^2$/g or less, when the core-shell type silica is used as a filler for liquid chromatography, the substance to he separated, which is adsorbed by the shell, is not adsorbed by the core particle, and thereby the separation efficiency is increased. The specific surface area of the core particles is preferably 30 m$^2$/g or less.

The non-porous silica particles in this step may be a commercially available product, or may he produced using, for example, the production method described in the examples of Patent Document 3.

In this step, the volume average particle size ($D_v$) of the non-porous silica particles is normally 20 nm or greater, preferably 30 nm or greater, and more preferably 40 nm or greater, from the perspective of ensuring dispersion stability of the non-porous silica particles in the reaction solution. On the other hand, from the perspective of reducing the volume fraction of the non-porous silica particles in the core-shell porous silica particles, the volume average particle size ($D_v$) of the non-porous silica particles is typically 1.5 μm or less, preferably 1.2 μm or less, and more preferably 1.0 μm or less.

Note that the volume average particle size ($D_v$) is obtained, for example, by randomly selecting approximately 100 particles from a particle image captured by an electron microscope and measuring the particle size thereof.

From the perspective of increasing the filling rate of core-shell porous silica particles that are ultimately produced, the particle size dispersity ($C_v$) of the non-porous silica particles in the present step is normally 15% or less, preferably 10% or less, and more preferably 8% Or less. Also, the particle size dispersity ($C_v$) is typically greater than 0%.

Note that the particle size dispersity ($C_v$) is also obtained, for example, by randomly selecting approximately 100 particles. from a particle image captured by an electron microscope and measuring the particle size thereof.

When the volume fraction of the non-porous silica particles prepared by this step relative to the reaction volume in the precursor shell formation step is set to be greater than a certain value, almost the entire amount of the silica source is consumed in the formation of the shell, and therefore the production of new porous silica particles is suppressed. That is, when the volume fraction of the non-porous core particles relative to the reaction volume is too small, fine porous silica particles may be produced, and therefore, the volume fraction of the non-porous core particles relative to the reaction volume is usually 0.001 vol. % or greater, preferably 0.010 vol. % or greater, and more preferably 0.020 vol. % or greater. On the other hand, from the perspective of reducing the frequency of collision between the non-morons silica particles in the solution, the volume fraction of the non-porous core particles relative to the reaction volume is usually 50 vol. % or less, preferably 20 vol. % or less, and more preferably 10 vol. % or less.

(Method for Producing Non-Porous Silica Particles)

The method for producing the non-porous silica particles in the present step is not particularly limited. An example of the method includes the production method described in "Preparation Example 1 of core particles (non-porous silica particles)" in the examples of Patent Document 3. In this production method of the examples, a small sealed glass reactor with an internal volume of 110 ml was used, and stirring was performed using a magnetic stirrer to make the reaction solution be uniform.

(Cationic Surfactant)

The cationic surfactant in this step acts as a template for forming pores in the shell. The type and concentration of the cationic surfactant greatly affect the shape of the pores of the shell. In this step, one type of cationic surfactant may be used, or two or more types may be used in combination, but use of one type is preferred in order to form a shell haying uniform pores.

The type of cationic surfactant in this step is not particularly limited as long as the desired effect of the present disclosure is achieved, but alkylammonium halides and alkylamines are preferable.

Examples of alkylammonium halides include tetradecyltrimethylammonium halides, hexadecyltrimethylammonium halides, octadecyltrimethylammonium halides, eicosyltrimethylammonium halides, and docosyltrimethylammonium halides. Of these, from the perspective of the size of the pores to be formed, hexadecyltrimethylammonium halides and octadecyltrimethylammonium halides are preferred, and hexadecyltrimethylammonium bromide (cetyltrimethylammonium bromide; CTAB) and octadecyltrimethylarmonium bromide (octadecyltrimethylammonium bromide) are more preferred.

Examples of the alkylamines include linear alkylamines having from 8 to 20 carbons, and dodecylamine is particularly preferable from the perspective of easily forming uniform pores.

The overall concentration of the cationic surfactant(s) is typically 0.1 mM or greater, preferably 1 mM or greater, and more preferably 5 mM or greater in order to sufficiently exhibit the effect as a template. On the other hand, in order to form uniform pores, the overall concentration of the cationic surfactant(s) is usually 1000 mM or less, preferably 500 mM or less, and more preferably 100 mM or less.

(Basic Catalyst)

In this step, the basic catalyst is not particularly limited, and inorganic and organic basic catalysts that can be used to produce core-shell porous silica particles can be appropriately used. One type of basic catalyst may be used alone, or two or more types may be used in combination. Among these, ammonium-based or amine-based basic catalysts, which are nitrogen-based basic catalysts, are preferable, and highly reactive ammonia is more preferable. Furthermore in cases where ammonia is used, the use of aqueous ammonia is preferable from the perspective of safety.

From the perspective of promoting the reaction, the overall concentration of the basic catalyst(s) is typically 0.01 mM or greater, preferably 0.05 mM or greater, more preferably 0.1 mM or greater, even more preferably 1 mM or greater, and particularly preferably 10 mM or greater. On the other hand, from the perspective of reaction control, the overall concentration of the basic catalyst(s) is typically 10 M or less, preferably 5 M or less, more preferably 3 M or less, even more preferably 500 mM or less, and particularly preferably 100 mM or less.

(Hydrophobic Part-Containing Additive)

The aqueous solution prepared in this step may contain a hydrophobic part-containing additive. This is because the hydrophobic part-containing additive has the effect of increasing the pore diameter. The type of the hydrophobic part-containing additive is not particularly limited as long as the desired effect according to an embodiment of the present disclosure is achieved, and examples thereof include substances having a low solubility in water, such as benzene, toluene, cyclohexane (CyH), cyclohexanol, dodecanol, decane, chlorododecane, 1,3,5-trimethylbenzene (TMB), and 1,3,5-triisopropylbenzene. From the perspective of the degree of nonpolarity, among these, cyclohexane (CyH), 1,3,5-trimethylbenzene (TMB), and 1,3,5-triisopropylbenzene are preferable, and cyclohexane (CyH) and 1,3,5-trimethylbenzene (TMB) are more preferable. One type of hydrophobic part-containing additive may be used alone, or two or more types may be used in combination.

From the perspective of exhibiting the effect of increasing the pore diameter, the overall concentration of the hydrophobic part-containing additive is typically not less than 1 mM, preferably not less than 5 mM, and more preferably not less than 10 mM. On the other hand, from the perspective of maintaining an integrated structure formed by the cationic surfactant, the overall concentration of the hydrophobic part-containing additive is typically not greater than 1000 mM, preferably not greater than 750 mM, and more preferably not greater than 500 mM.

From the perspective of expanding hydrophobic environment spaces formed by the cationic surfactant, the amount of the hydrophobic part-containing additive relative to the cationic surfactant in this step is usually not less than 0.1, and is, in order of increasing preference, not less than 0.5, not less than 1.0, not less than 3.0, and not less than 5.0, as a weight ratio of the hydrophobic part-containing additive to the cationic surfactant. On the other hand, from the perspective of avoiding disintegration of the shell in the shell formation step, the weight ratio of the hydrophobic part-containing additive to the cationic surfactant is typically 15.0 or less, preferably 12.0 or less, and more preferably 10.0 or less.

The aqueous solution prepared in this step contains an electrolyte. The electrolyte thickens the shell. Examples of the electrolyte include chlorine-based electrolytes, bromine-based electrolytes, and iodine-based electrolytes. Specific examples of chlorine-based electrolytes include sodium chloride, potassium chloride, and lithium chloride. Examples of bromine-based electrolytes include sodium bromide, potassium bromide, and lithium bromide. Examples of the iodine-based electrolyte include sodium iodide, potassium iodide, and lithium iodide. From the perspective of further thickening the shell, a bromine-based electrolyte such as sodium bromide, potassium bromide, or lithium bromide is preferable as the electrolyte, and of these, lithium bromide is more preferable.

The concentration of the electrolyte in the aqueous solution of this step is preferably not less than 1 mM, more preferably not less than 2 mM, and even more preferably not less than 3 mM from the perspective of thickening the shell. On the other hand, in order to ensure that uncoated particles, non-spherical particles, and aggregates, etc. are not produced, the concentration of the electrolyte is preferably not greater than 7.5 mM, more preferably not greater than 7 mM, even more preferably not greater than 6 mM, even more preferably not greater than 5 mM, and still more preferably not greater than 4 mM.

(Alcohol)

The alcohol in this step is at least one type selected from the group consisting of methanol, ethanol, isopropanol, n-propanol, ethylene glycol, and glycerin, and from the perspective of good solubility of the silica raw material, methanol and ethanol are preferable, and ethanol is more preferable.

The concentration of the alcohol is typically 0.1 M or greater, preferably 0.5 M or greater, and more preferably 1 M or greater. On the other hand, the concentration thereof is typically not greater than 18 M, preferably not greater than 17 M, and more preferably not greater than 15 M.

In case where, for example, tetraethoxysilane is used as the silica source for producing porous silica, hydrolysis of the alkoxysilane can be controlled at a suitable rate and the porous silica can be formed uniformly on the surface of silica core particles by setting the alcohol concentration to 0.1 M or higher. Also, when the alcohol concentration exceeds 18 M, production of porous silica with good efficiency is hindered.

(Other)

In this step, components in addition to those described above can be added to prepare the aqueous solution as long as the desired effect according to an embodiment of the present disclosure is achieved.

<2. Shell Precursor Formation Step>

The present disclosure includes a shell precursor formation step in which a silica source is added to the aqueous solution prepared in the above-mentioned preparation step, and a shell precursor is formed on the surface of the non-porous silica particles. Other steps may be included.

(Silica Source)

The silica source in this step may be any substance capable of forming a silicon oxide by reaction, and from the perspective of reaction efficiency and handling, an alkoxysilane, sodium silicate, and mixtures thereof are preferable, and alkoxysilanes are more preferable. In addition, from the perspective of versatility, of the alkoxysilanes, trimethylmethoxysilane, trimethylethoxysilane, tetraethoxysilane (tetraethylorthosilicate; TEOS), and tetramethoxysilane are more preferable, and tetraethoxysilane (tetraethylorthosilicate; TEOS) is particularly preferable.

The silica source in this step is added as a solution to the aqueous solution prepared in the preparation step. The silica source is preferably added as an alcohol solution described in the "(Alcohol)" section of the preparation step, but is not particularly limited thereto as long as the shell precursor can be formed on the surface of the non-porous silica particles.

The concentration of the silica source in this step is usually 0.1 mM or greater, preferably 0.5 mM or greater, and more preferably 1 mM or greater. On the other hand the concentration thereof is ordinarily not greater than 200 mM, preferably not greater than 150 mM, and more preferably not greater than 100 mM.

The core particles can be sufficiently coated with the shell by setting the concentration of the silica source to 0.1 mM or greater. On the other hand, when the concentration of the silica source is set to 200 mM or less, substantially the entire amount of the silica source is consumed in the formation of the shell, and the production of new silica particles is suppressed.

(Shell Precursor Formation)

Silica is precipitated on the surfaces of the non-porous core particles at a nearly uniform thickness as a result of the reaction of the aqueous solution prepared in the preparation step with the silica source that was added. Here, micelles of the cationic surfactant are incorporated into the silica, thereby forming a shell precursor containing silica and the cationic surfactant. Also, when the hydrophobic part-containing additive is present, the hydrophobic part-containing additive dissolves in the hydrophobic environment formed by the cationic surfactant, and the hydrophobic field site is expanded by this dissolution, and as a result, a porous shell precursor with a large pore diameter is formed.

(pH)

The pH when the shell precursor is formed is typically 8 or higher, preferably 8.5 or higher, and more preferably 9 or higher. Furthermore, the pH thereof is generally 13 or lower, preferably 12.5 or lower, and more preferably 12 or lower.

A pH of less than 8 is not desirable because the hydrolysis rate of the silica source is slow. On the other hand, when the pH exceeds 13, the hydrolysis rate of the silica source cannot be controlled, which is not preferable.

Examples of methods for adjusting the pH include a method of adding a basic compound, and an example thereof is a method in which a basic surfactant, for example, an alkylamine, is added as a surfactant.

(Temperature)

From the perspective of the reaction rate, the temperature at which the shell precursor is formed is typically 5° C. or higher, preferably 10° C. or higher, and more preferably 15° C. or higher. On the other hand, from the perspectives of reaction controllability and boiling point of the solvent, the temperature is typically not higher than 80° C., preferably not higher than 70° C., and more preferably not higher than 60° C.

(Time)

From the perspective of uniformity of the shell precursor that is formed, the time taken for shell precursor formation is usually 30 minutes or longer, preferably 1 hour or longer, and more preferably 2 hours or longer. Meanwhile, from the perspective of efficient shell precursor formation, the time taken for shell precursor formation is usually 48 hours or less, preferably 36 hours or less, and more preferably 24 hours or less.

<3. Shell Formation Step>

The present disclosure includes a shell formation step in which the cationic surfactant is removed from the shell precursor formed in the above-mentioned step, and a porous shell is formed. Other steps may be included.

If present, the hydrophobic part-containing additive is also removed in this step, and the conditions for removal are similar to the conditions for removal of the cationic surfactant. Also, when the hydrophobic part-containing additive is present, the hydrophobic part-containing additive is removed along with the removal of the cationic surfactant.

Examples of methods that can be used to remove the cationic surfactant from the shell precursor formed in the shell precursor formation step include a method of adding the shell precursor into a solvent in which the cationic surfactant dissolves and eluting the cationic surfactant into the solvent, and a method of firing the shell precursor formed in the shell precursor formation step to thereby burn off the cationic surfactant contained in the shell precursor. Both of these methods are preferred methods, and it is more preferable to use the two methods in combination in order to completely remove the cationic surfactant.

With the latter firing method, the firing temperature is ordinarily 300° C. or higher, preferably 350° C. or higher, and more preferably 400° C. or higher from the perspective of sufficient removal of the cationic surfactant. Meanwhile, from the perspective of maintaining the porous structure, the firing temperature is ordinarily not higher than 1000° C., preferably not higher than 900° C., and more preferably not higher than 800° C.

Furthermore, from the perspective of sufficient removal of the cationic surfactant, the firing time is ordinarily 30 minutes or longer, preferably 1 hour or longer, and more preferably 2 hours or longer. Meanwhile, from the perspective of efficient removal thereof, the firing time is ordinarily not longer than 24 hours, preferably not longer than 12 hours, and more preferably not longer than 6 hours.

In this step, in addition to the above steps, a washing step in which the shell precursor formed in the shell precursor formation step is washed, and a drying step in which the shell precursor is dried may be included. The preferred order of these steps is formation of the shell precursor, and then the washing step, the drying step, and removal of the cationic surfactant.

(Washing Step)

In the washing step, washing can be carried out by, for example, precipitating the shell precursor through centrifugal separation, and replacing the solution. The solution used for washing is preferably water, and particularly deionized water (ultrapure water), and washing is generally carried out three times.

(Drying Step)

In the drying step, drying can be carried out by, or example, leaving the shell precursor to stand overnight under a vacuum condition at room temperature after the reaction solution has been removed by centrifugation.

<4. Core-Shell Porous Silica Particles>

Core-shell porous silica particles are produced by the production method according to an embodiment of the present disclosure.

From the perspective of operability such as column pressure loss when the core-shell porous silica particles are used as a chromatography filler, the volume average particle size (Dv) of the core-shell porous silica particles produced by the production method according to an embodiment of the present disclosure is ordinarily 0.03 μm or more, preferably 0.15 μm or more, more preferably 0.75 μm or more, and even more preferably 0.90 μm or more. On the other hand, from the perspective of column performance such as column efficiency when the core-shell porous silica particles are used as a chromatography filler, the volume average particle size (Dv) of the core-shell porous silica particles is ordinarily 50 μm or less, preferably 20 μm or less, and more preferably 10 μm or less.

The volume average particle size (Dv) is obtained, for example, by randomly selecting approximately 100 particles from a particle image captured by an electron microscope, and then measuring the particle size thereof.

Because of the good filling properties in a chromatography column, the particle size dispersity (Cv) of the core-shell porous silica particles produced by the production method according to an embodiment of the present disclosure is usually not greater than 10%, preferably not greater than 9%, more preferably not greater than 8%, and even more preferably not greater than 7%. Also, the particle size dispersity (Cv) is typically greater than 0%.

The particle size dispersity (Cv) is obtained, for example, by randomly selecting approximately 100 particles from a particle image captured by an electron microscope and measuring the particle size thereof.

From the perspective of high porosity, the shell thickness ($T_s$) of the core-shell porous silica particles produced by the production method according to an embodiment of the present disclosure is ordinarily not less than 10 nm, and in order of increasing preference, is not less than 65 nm, not less than 75 nm, not less than 100 nm, not less than 110 nm, not less than 120 nm, and not less than 125 nm. On the other hand, from the perspective of mechanical strength of the particles, the shell thickness ($T_s$) is usually not greater than 500 nm, and in order of increasing preference, is not greater than 400 nm, not greater than 300 nm, not greater than 200 nm, and not greater than 150 nm.

The shell thickness ($T_s$) is obtained, for example, by calculating the difference in the volume average particle size (Dv) between the produced particles and the core particles.

Furthermore, the core-shell porous silica particles produced by the production method according to an embodiment of the present disclosure are produced using an aqueous solution containing an electrolyte, as previously described. As in the examples described below, the shell thickness ($T_s$) of the produced particles is significantly greater than that of particles produced using an aqueous solution not containing an electrolyte.

From the perspective of ensuring sufficient permeability of the substances to be separated, the specific surface area ($S_{BET}$) of the core-shell porous silica particles produced by a production method according to an embodiment of the present disclosure is ordinarily 20 m$^2$/g or greater. preferably 30 m$^2$/g or greater, more preferably 50 m$^2$/g or greater, even more preferably 200 m$^2$/g or greater, and yet even more preferably 300 m$^2$/g or greater. On the other hand, from the perspective of operability such as the elution time of the substances to be separated when the core-shell porous silica particles are used as a chromatography filler, the specific surface area (SBET) is typically not greater than 3000 m$^2$/g, preferably not greater than 2000 m$^2$/g, and more preferably not greater than 1500 m$^2$/g . The specific surface area ($S_{BET}$) is obtained, for example, by calculating the nitrogen adsorption/desorption isotherm through BET analysis.

From the perspective of ensuring sufficient permeability of the substances to be separated, the pore volume ($V_p$) of the core-shell porous silica particles produced by the production method according to an embodiment of the present disclosure is ordinarily 0.05 cm$^3$/g or greater, preferably 0.075 cm$^3$/g or more, more preferably 0.1 cm$^3$/g or greater, even more preferably 0.15 cm$^3$/g or greater, and yet even more preferably 0.2 cm$^3$/g or greater. On the other hand, from the perspective of operability such as the elution time of the substances to be separated when the core-shell porous silica particles are used as a chromatography filler, the pore volume ($V_p$) is ordinarily 5 cm$^3$/g or less, preferably 3 cm$^3$/g or less, and more preferably 2 cm$^3$/g or less. The pore volume ($V_p$) is obtained, for example, by converting the amount of adsorption when the ratio of the vapor pressure to the saturated vapor pressure is 0.99.

When the core-shell porous silica particles are actually used as a liquid chromatography filler or the like, they function as an adsorption layer, and therefore the peak pore diameter ($D_p$) of the core-shell porous silica particles produced by the production method according to an embodiment of the present disclosure is ordinarily 1 nm or greater, preferably 2 nm or greater, and more preferably 2.4 nm or greater. On the other hand, since the core-shell porous silica particles can be used to separate large molecules such as proteins, the peak pore diameter ($D_p$) is typically not greater than 100 nm, preferably not greater than 50 nm, and more preferably not greater than 30 nm. The peak pore diameter ($D_p$) is obtained from, for example, the nitrogen adsorption/desorption isotherm by BJH analysis.

EXAMPLES

The present disclosure is described in further detail below through specific examples; however, the examples are by no means intended to limit the present disclosure.

Example 1

(Raw Materials for Core-Shell Porous Silica Particles)

Core particle: non-porous silica particle (spherical silica, available from Sakai Chemical Industry Co., Ltd.) ($D_v$=725 nm, $C_v$=6.9%)

Cationic surfactant: hexadecyltrimethylammonium halide (cetyltrimethylammonium bromide; CTAB) (guaranteed reagent, purity of 98.0%, available from Wako Pure Chemical Industries, Ltd.)

Basic catalyst: aqueous ammonia solution (guaranteed reagent, 25 wt. %, available from Wako Pure Chemical Industries Co., Ltd.)

Alcohol: ethanol (guaranteed reagent, 99.5%, available from Wako Pure Chemical Industries, Ltd.)

Silica source: tetraethoxysilane (tetraethylorthosilicate; TEOS) (guaranteed reagent, purity of 95.0%, available from Wako Pure Chemical Industries, Ltd.)

Electrolyte: sodium chloride (NaCl) (guaranteed reagent, purity of 99.5%, available from Wako Pure Chemical Industries, Ltd.)

Deionized water: deionized water produced by ion removal and microparticle filtration using an ultrapure water producing device (Merck & Co., Inc.); electrical resistance of 18.2 MΩ·cm

11

(Production Method)

A screw tube bottle was used as the reactor, and a magnetic stirrer was used for stirring.

The core particles and cationic surfactant CTAB were dispersed ultrasonically in the deionized water. Next, the electrolyte NaCl was added to the above core particle dispersion at an amount at which the concentration of the electrolyte NaCl was 1 mM. Subsequently, ethanol was added as an alcohol, and an aqueous ammonia solution was added as a basic catalyst, the mixture was stirred for 30 minutes, and TEOS was added as a silica source to thereby initiate a hydrolysis/condensation reaction. The reaction was carried out at 35° C. for 18 hours. After completion of the reaction, the generated particles were collected by centrifugation, and vacuum dried overnight at 60° C. to remove the moisture. Next, the particles were fired for 4 hours at 550° C. in the atmosphere to thereby remove the cationic surfactant, which was a template for the pores, and core-shell porous silica particles were obtained.

The concentration of each reagent was as follows: 20 mM of CTAB, 60 mM of TEOS, 10 mM of the aqueous ammonia solution, 0.42 (v/v) of the ethanol/deionized water, and 0.63 vol. % of the core particles (non-porous silica particles).

Examples 2 to 4

Core-shell porous silica particles were obtained in Examples 2, 3, and 4 in the same manner as in Example 1 with the exception that the concentration of the electrolyte NaCl was changed to 2, 4, and 8 mM, respectively.

Comparative Example 1

The same procedures as those of Example 1 were carried out with the exception that the above-mentioned deionized water was added instead of the NaCl electrolyte.

(Evaluation Methods)

Observation of core-shell porous silica particles

A scanning transmission electron microscope (FE-STEM, available from Hitachi, Ltd., HD-2700) was used to observe the particle form. As the sample for TEM observations, a product obtained by dripping a suspension of the product onto a collodion film-attached mesh (200 mesh, available from JEOL Ltd.) and drying naturally was used.

Zeta potential measurement

A laser zeta potentiometer (ELS, available from Otsuka Electronics Co., Ltd., ELS-8000) was used to measure the zeta potential of the particles. A sample obtained by dispersing the particles in a mixed solution of a 0.42 (v/v) composition of EtOH/H$_2$O was used as the measurement sample. The measurement temperature was 35° C., which was the same as the reaction temperature, and values including a relative permittivity of 61.1, a refractive index of 1.36, and a viscosity of 1.48 mPa·s were respectively used as the physical properties of the solvent at the same temperature.

Measurement of nitrogen adsorption/desorption isotherm and peak pore diameter ($D_p$)

12

The nitrogen adsorption/desorption isotherms of the particles were measured using an automatic specific surface area/pore distribution measurement device (BELSORP-mini II, available from MicrotracBEL Corp.), and the specific surface area and pore diameter were calculated. A Pyrex standard sample tube was used as a sample tube, and a BELPREP-vac II was used for pre-treatment. Particles fired at 550° C. were used as the measurement sample, and subjected to a pre-treatment 300° C. for 3 hours under vacuum, after which measurements were started. The BET specific surface area and pore diameter distribution (BJH method) were calculated using BEL Master as the analysis software.

Calculation of volume average particle size ($D_v$) and particle size dispersity ($C_v$)

To calculate the particle size distribution the particle sizes were measured directly from a TEM image using calipers (available from Mitutoyo Corporation). For each sample, the particle sizes of approximately 100 particles were measured, and the volume average particle size dv (synonymous with the $D_v$ above) was calculated from the following definitional equation (1), the standard deviation σ was calculated from the following definitional equation (2), and the particle size dispersity $C_v$ was calculated from the following definitional equation (3). Note that in the equations, di denotes the particle size and ni denotes the number of particles.

[Equation 1]

$$d_v = \left( \sum_i n_i d_i^3 \Big/ \sum_i n_i \right)^{1/3} \quad (1)$$

[Equation 2]

$$\sigma = \left[ \sum_i \left\{ d_i - \left( \sum_i n_i d_i \Big/ \sum_i n_i \right) \right\}^2 \right]^{1/2} \quad (2)$$

[Equation 3]

$$Cv = \frac{\sigma}{\sum_i n_i d_i \Big/ \sum_i n_i} \times 100 \quad (3)$$

(Results)

Figure 1:
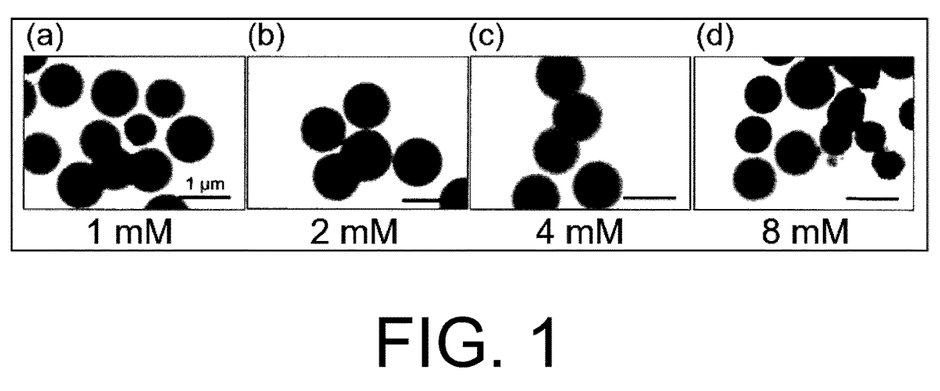
FIG. 1 is a scanning transmission electron microscope (STEM) image of particles obtained in Examples 1 to 4 (a photograph in lieu of a drawing).
Figure 2:
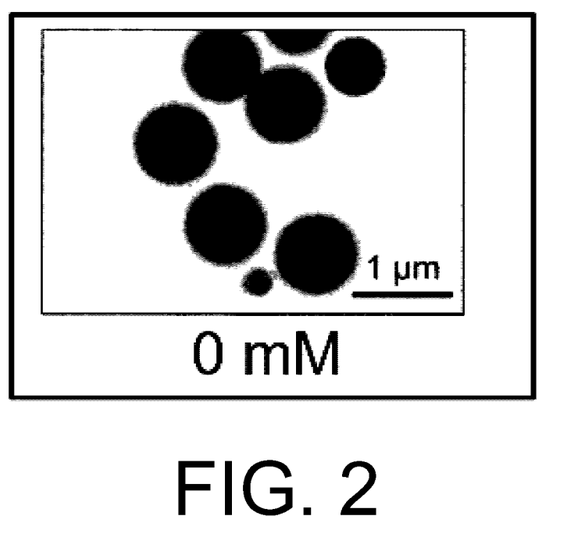
FIG. 2 is a scanning transmission electron microscope (STEM) image of particles obtained in Comparative Example 1 (a photograph in lieu of a drawing).

STEM images of particles obtained in Examples 1 to 4 are shown in FIG. 1, and a STEM image of particles obtained in Comparative Example 1 is shown in FIG. 2. In addition, results obtained by evaluating each of the particles in accordance with the evaluation methods described above are presented in Table 1 below. Note that "n.d." in the table indicates no data.

[Table 1]

TABLE 1

| | Produced Core-Shell Porous Silica Particles | | | | | | | |
|---|---|---|---|---|---|---|---|---|
| | Particle Size (nm) | Electrolyte Concentration (mM) | Particle Size Dispersity $C_v$ (%) | Shell Thickness $T_s$ (nm) | Specific Surface Area $S_{BET}$ (m$^2$/g) | Pore Volume $V_p$ (cm$^3$/g) | Peak Pore Diameter $D_p$ (nm) | FIG. No. |
| Example 1 | 942 | 1 | 5.6 | 108 | 356 | 0.242 | 2.5 | FIG. 1(a) |
| Example 2 | 949 | 2 | 6.3 | 112 | 324 | 0.225 | 2.5 | FIG. 1(b) |

TABLE 1-continued

| | Produced Core-Shell Porous Silica Particles | | | | | | | |
|---|---|---|---|---|---|---|---|---|
| | Particle Size (nm) | Electrolyte Concentration (mM) | Particle Size Dispersity $C_v$ (%) | Shell Thickness $T_s$ (nm) | Specific Surface Area $S_{BET}$ (m$^2$/g) | Pore Volume $V_p$ (cm$^3$/g) | Peak Pore Diameter $D_p$ (nm) | FIG. No. |
| Example 3 | 978 | 4 | 4.8 | 126 | 319 | 0.234 | 2.5 | FIG. 1(c) |
| Example 4 | 973 | 8 | 6.7 | 124 | n.d. | n.d. | n.d. | FIG. 1(d) |
| Comparative Example 1 | 862 | 0 | 7.3 | 70 | 193 | 0.127 | 2.3 | FIG. 2 |

From the above results, it was found that the shell is thickened by adding an electrolyte. The thickness of the formed shell was maximized (126 nm) when the electrolyte concentration was 4 mM, and this maximum shell thickness was 1.8 times the shell thickness (70 nm) that was obtained when an electrolyte was not added, and the shell volume increased to approximately 2 times the shell volume that was obtained when an electrolyte was not added. In addition, all of the particles covered by the shell exhibited monodispersity.

Example 5

Core-shell porous silica particles were obtained in Example 5 in the same manner as in Example 1 with the exception that the core particles were changed to non-porous silica particles (available from Sakai Chemical Industry Co., Ltd., spherical silica) having a $D_v$=451 nm and a $C_v$=4.9%, the electrolyte was changed to KCl, and the electrolyte concentration was changed to 2 mM.

Examples 6 to 13

Core-shell porous silica particles were obtained in Examples 6, 7, 8, 9, 10, 11, 12, and 13 in the same manner as in Example 5 with the exception that the electrolyte was changed to NaCl, LiCl, KBr, NaBr, LiBr, KI, NaI and LiI, respectively.

Comparative Example 2

The same procedures as those of Example 5 were carried out with the exception that the above-mentioned deionized water was added instead of the KCl electrolyte.

(Results)

Figure 3:
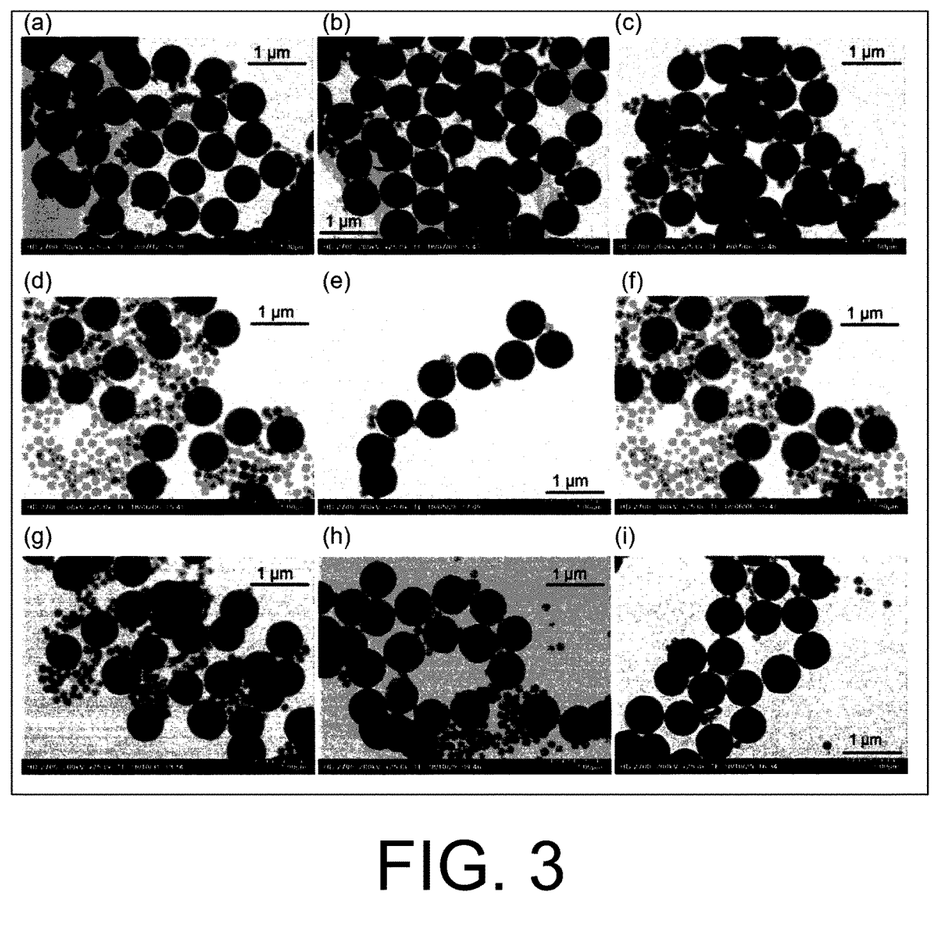
FIG. 3 is a scanning transmission electron microscope (STEM) image of the particles obtained in Example 5 to 13 (a photograph in lieu of a drawing).
Figure 4:
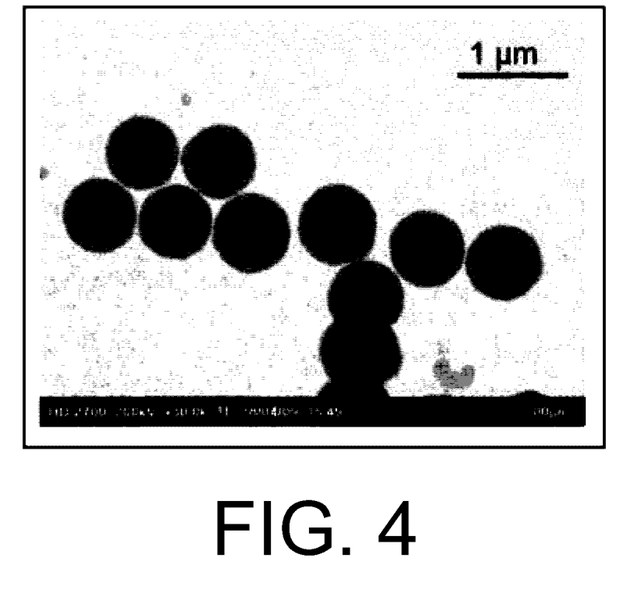
FIG. 4 is a scanning transmission electron microscope (STEM) image of the particles obtained in Comparative Example 2 (a photograph in lieu of a drawing).

STEM images of particles obtained in Examples 5 to 13 are shown in FIG. 3, and a STEM image of particles obtained in Comparative Example 2 is shown in FIG. 4. In addition, results obtained by evaluating each of the particles in accordance with the same evaluation methods of Examples 1 to 4 and Comparative Example 1 are presented in Table 2 below.

[Table 2]

TABLE 2

| | Produced Core-Shell Porous Silica Particles | | | | | | | | |
|---|---|---|---|---|---|---|---|---|---|
| | Particle Size (nm) | Electrolyte | Electrolyte Concentration (mM) | Particle Size Dispersity $C_v$ (%) | Shell Thickness $T_s$ (nm) | Specific Surface Area $S_{BET}$ (m$^2$/g) | Pore Volume $V_p$ (cm$^3$/g) | Peak Pore Diameter $D_p$ (nm) | FIG. No. |
| Example 5 | 655 | KCl | 2 | 3.6 | 102 | 386 | 0.296 | 2.6 | FIG. 3(a) |
| Example 6 | 637 | NaCl | 2 | 3.2 | 93 | 353 | 0.277 | 2.6 | FIG. 3(b) |
| Example 7 | 659 | LiCl | 2 | 3.7 | 104 | 390 | 0.309 | 2.6 | FIG. 3(c) |
| Example 8 | 680 | KBr | 2 | 3.6 | 114 | 462 | 0.344 | 2.6 | FIG. 3(d) |
| Example 9 | 673 | NaBr | 2 | 3.2 | 111 | 358 | 0.286 | 2.6 | FIG. 3(e) |
| Example 10 | 685 | LiBr | 2 | 3.2 | 117 | 345 | 0.247 | 2.6 | FIG. 3(1) |
| Example 11 | 651 | KI | 2 | 3.4 | 100 | 414 | 0.323 | 2.6 | FIG. 3(g) |
| Example 12 | 659 | NaI | 2 | 3.5 | 104 | 424 | 0.329 | 2.6 | FIG. 3(h) |
| Example 13 | 652 | LiI | 2 | 3.2 | 100 | 409 | 0.321 | 2.6 | FIG. 3(i) |
| Comparative Example 2 | 596 | — | 0 | 3.7 | 73 | 265 | 0.224 | 2.7 | FIG. 4 |

From the above results it was found that the shell is thickened by adding an electrolyte. It was also found that bromine-based electrolytes among the electrolytes contribute greatly to the thickening of the shell. The thickness of the formed shell was maximized (117 nm) when the electrolyte was LiBr, and this shell thickness increased to 1.6 times compared to when an electrolyte was not added (73 nm). In addition, all of the particles covered by the shell exhibited monodispersity.

INDUSTRIAL APPLICABILITY

The production method according to the present disclosure can be applied, for example, as a method for producing core-shell porous silica particles that are used in a drug delivery system (DDS) or in a filler for a liquid chromatography column.

The invention claimed is:

1. A method for producing core-shell porous silica particles, the method comprising:
    a preparation step of preparing a dispersion comprising an aqueous solution comprising a cationic surfactant, a basic catalyst, an electrolyte, an alcohol, and non-porous silica particles dispersed in the aqueous solution;
    a shell precursor formation step of adding a silica source to the dispersion to form a shell precursor on a surface of the non-porous silica particles; and
    a shell formation step of removing the cationic surfactant from the shell precursor to form a porous shell.

2. The production method according to claim 1, wherein a concentration of the electrolyte the aqueous solution is from 1 mM to 4 mM.

3. The production method according to claim 1, wherein the electrolyte is a chlorine-based electrolyte, a bromine-based electrolyte, or an iodine-based electrolyte.

4. The production method according to claim 3, wherein the chlorine-based electrolyte is sodium chloride, potassium chloride or lithium chloride.

5. The production method according to claim 3, wherein the bromine-based electrolyte is sodium bromide, potassium bromide, or lithium bromide.

6. The production method according to claim 3, wherein the iodine-based electrolyte is sodium iodide, potassium iodide, or lithium iodide.

7. The production method according to claim 1, wherein the cationic surfactant is a hexadecyltrimethylammonium halide or an octadecyltrimethylammonium halide.

8. The production method according to claim 1, wherein the basic catalyst is ammonia.

9. The production method according to claim 1, wherein the alcohol is ethanol.

10. The production method according to claim 1, wherein the silica source is tetraethoxysilane.

11. The production method according to claim 1, wherein the non-porous silica particles has a volume average particle size, Dv, of 20 nm to 1.5 μm.

12. The production method according to claim 1, wherein the non-porous silica particles has a volume average particle size, Dv, of 40 nm to 1.0 μm.

13. The production method according to claim 1, wherein a concentration of the electrolyte in the aqueous solution is from 1 mM to 8 mM.

14. The production method according to claim 1, wherein a specific surface area of the non-porous silica particles is 50 $m^2/g$ or less.

* * * * *

UNITED STATES PATENT AND TRADEMARK OFFICE
CERTIFICATE OF CORRECTION

PATENT NO. : 11,964,253 B2
APPLICATION NO. : 17/252042
DATED : April 23, 2024
INVENTOR(S) : Daisuke Nagao et al.

It is certified that error appears in the above-identified patent and that said Letters Patent is hereby corrected as shown below:

In the Claims

Column 15, Line 33, Claim 2:
Change:
"a concentration of the electrolyte the aqueous solution is"
To:
--a concentration of the electrolyte in the aqueous solution is--

Signed and Sealed this
Sixth Day of August, 2024

Katherine Kelly Vidal
*Director of the United States Patent and Trademark Office*